United States Patent [19]

Apter et al.

[11] Patent Number: 5,301,238
[45] Date of Patent: Apr. 5, 1994

[54] PROCESS FOR READING A CHAIN OF CODE CHARACTERS FROM A TRANSPARENT BOTTLE

[75] Inventors: Robert Apter, Rusdolfstetten, Switzerland; Nira Schwartz, Torrance, Calif.; George Plester, Essen; Hans-Willy Scholl, Oberhausen, both of Fed. Rep. of Germany

[73] Assignee: Elpatronic AG, Zug, Switzerland

[21] Appl. No.: 692,367

[22] Filed: Apr. 26, 1991

[30] Foreign Application Priority Data

Jul. 13, 1990 [CH] Switzerland ............ 02339/90.1

[51] Int. Cl.⁵ .................................. G06K 9/00
[52] U.S. Cl. .................................. 382/1; 382/8; 382/18; 235/464; 250/223 B
[58] Field of Search ............ 382/1, 8, 18, 51; 358/101; 356/237, 240; 250/223 B; 209/524, 525, 526; 235/464

[56] References Cited

U.S. PATENT DOCUMENTS

| | | | |
|---|---|---|---|
| 3,502,993 | 3/1970 | Schürzinger et al. | 328/151 |
| 3,745,314 | 7/1973 | Mathias et al. | 235/61.11 E |
| 3,963,918 | 6/1976 | Jensen et al. | 250/223 B |
| 3,991,883 | 11/1976 | Hobler et al. | 250/223 B |
| 4,250,405 | 2/1981 | Ashcroft et al. | 235/456 |
| 4,448,526 | 5/1984 | Miyazawa | 356/237 |
| 4,644,151 | 2/1987 | Juvinall | 250/223 B |
| 4,852,415 | 8/1989 | Bogatzi et al. | 73/865.8 |
| 4,990,792 | 2/1991 | Frei | 250/566 |
| 5,038,384 | 8/1991 | Ohoba | 382/18 |
| 5,095,204 | 3/1992 | Novini | 250/223 B |

FOREIGN PATENT DOCUMENTS

| | | | |
|---|---|---|---|
| 0155789 | 9/1985 | European Pat. Off. | |
| 0331354 | 9/1989 | European Pat. Off. | 382/1 |
| 2429160 | 1/1975 | Fed. Rep. of Germany | |
| 2520136 | 11/1975 | Fed. Rep. of Germany | |
| 2943811 | 5/1980 | Fed. Rep. of Germany | |
| 3611536 | 10/1987 | Fed. Rep. of Germany | |
| 3637210 | 5/1988 | Fed. Rep. of Germany | |
| 3722422 | 3/1989 | Fed. Rep. of Germany | |
| 3837657 | 5/1990 | Fed. Rep. of Germany | |
| 3829025 | 11/1990 | Fed. Rep. of Germany | |
| 0040583 | 4/1978 | Japan | 356/240 |
| 0278740 | 12/1986 | Japan | 250/223 B |
| 0243193 | 9/1989 | Japan | 356/240 |
| 2071892 | 9/1981 | United Kingdom | |

*Primary Examiner*—David K. Moore
*Assistant Examiner*—Andrew W. Johns
*Attorney, Agent, or Firm*—McCormick, Paulding & Huber

[57] ABSTRACT

What is described is a process for reading a chain (34) of code characters which is arranged annularly on a transparent bottle (10) in the bottom area of the same, by photographing at least the bottom area of the bottle through the bottle neck by means of a camera (24) and simultaneously illuminating the bottom area of the bottle from below. With a zero relative speed of rotation between camera (24), bottle (10) and illumination source (32), a snapshot of the bottom area of the bottle with the complete code character chain (34) is taken from the inside of the bottle with the camera (24) and is stored as an image for the later decoding of the code character chain. The code-reading process is a very rapid process, because the fraction of a second in which the bottle (10) is in a line with the camera (24) and the illumination source (32) is adequate for reading the code. The evaluation of the image of the code character chain (34) which is photographed occurs using a histogram technique by comparison with a stored annular pattern which is divided into sectors.

9 Claims, 3 Drawing Sheets

Fig. 2
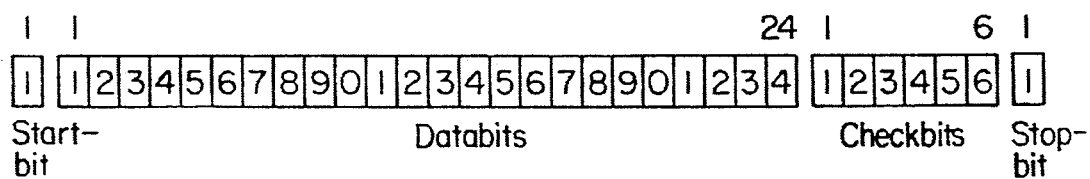
Start-bit | Databits | Checkbits | Stop-bit
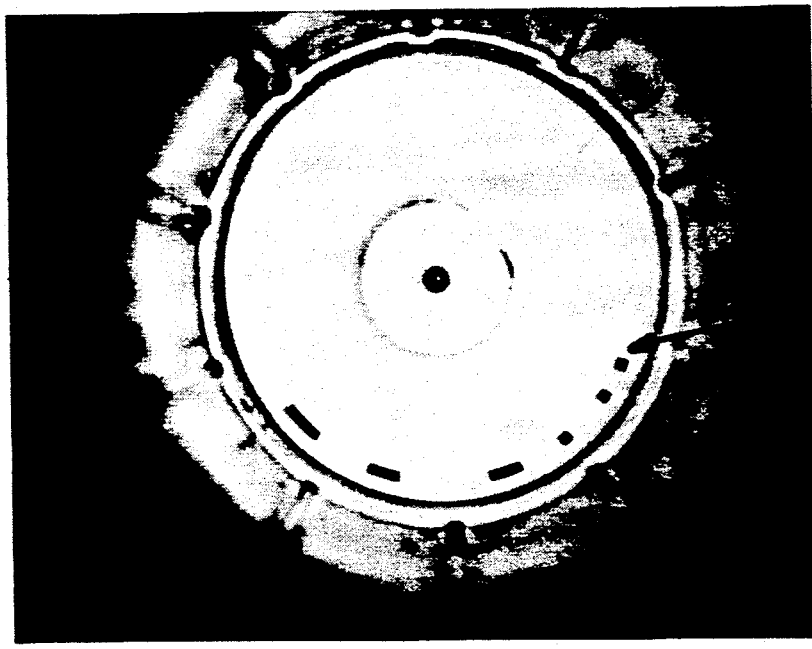
Fig. 3a
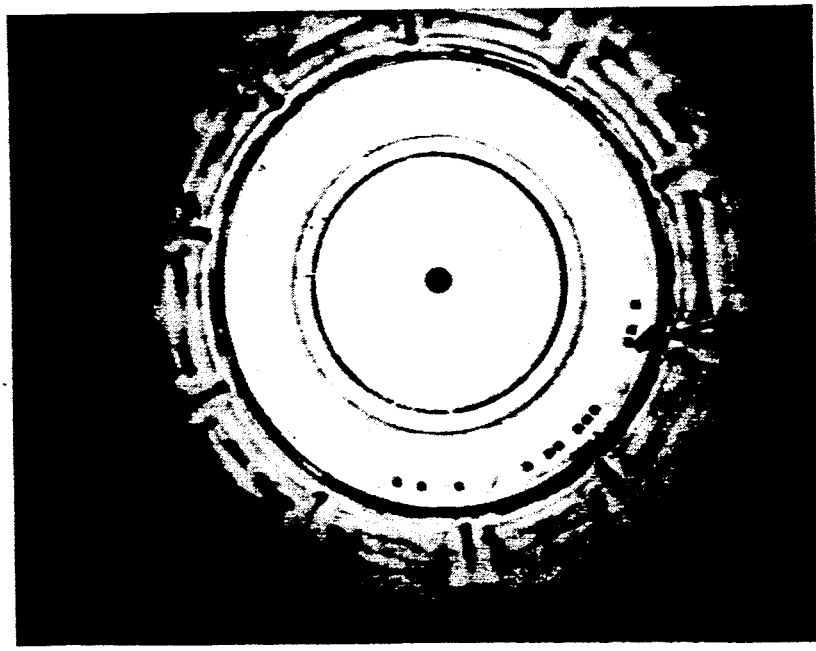
Fig. 3b

PROCESS FOR READING A CHAIN OF CODE CHARACTERS FROM A TRANSPARENT BOTTLE

BACKGROUND OF THE INVENTION

The invention relates to a process for reading a chain of code characters which is arranged on a transparent bottle or the like in the lower region of the same in an annular manner, by directing a camera through the neck of the bottle onto the lower region of the bottle, illuminating of the lower area of the bottle from outside and storing and decoding of the code character chain photographed with the camera.

U.S. Pat. No. 4,990,792 of the Applicant describes a process for introducing optically readable code characters onto the surface of containers, preferably plastic bottles, by producing cavities in the surface by means of a laser, so that the base of each code character is designed as a diffusely dispersing reflector. In the case of plastic bottles, this involves preferably multitrip PET bottles, i.e. PET bottles which are returned by the customer and then re-filled, which is intended to be done about 25 times per bottle. The code which according to this older German patent of the Applicant, is introduced by means of a laser, replaces, for example, the known Saint Gobain code of convex or depressed points, by means of which the blow die number is normally stated on the surface of the bottle, requires less time to apply than the known code and can record considerably more information. Moreover, it can be read more reliably. This reading takes place automatically with a reading head, for example, according to the further U.S. Pat. No. 4,852,415 of the Applicant. The reading head contains an optical electrical sensor which, by means of light guides, casts a beam of light sent out by a light source onto the surface of the bottle, and transmits a beam of light reflected by a code character back to a photoelectric receiver. For the reading procedure the bottle feed is interrupted when the bottle is opposite the sensor, and the bottle is rotated several times about its longitudinal axis, so that the sensor can record the chain of code characters several times.

This suspension of the feed and repeated rotation of each bottle opposite the sensor requires time, which should be as short as possible, as in inspection machines for re-fillable PET bottles the inspection capacity reaches 600 PET bottles/minute. Moreover, as multitrip plastic bottles become scratched more easily and are less stable in shape and resistant to ageing than glass ones, it can happen that with each refilling of the multitrip PET bottle, the process for the correct reading of its code creates further difficulties, because for example, the code character chain has altered its position or is noticeably blurred or indistinct. Furthermore, the known code-reading process is often made more difficult by the fact that bottles which are to be re-filled carry remains of labels or complete labels from the washing plant, or have been so badly scratched on the outside in use and for this reason create so much scattered light, that it is impossible to read the code correctly.

One code-reading process known from U.S. Pat. No. 4,250,405 avoids the last-mentioned problems by using for code-reading a camera which is so arranged that it points downwards through the neck of each bottle and is focussed on its base. A grid on the base of the bottle contains a code which indicates the number of the mould cavity in which the bottle has been manufactured. A code of nine characters is used, two of which indicate the beginning or end of the code. Light is projected from below through a gap onto the base of the bottle by means of an illumination source. In order to read the bottle code, its feed is interrupted underneath the camera, and the bottle is then rotated about its longitudinal axis. The code characters are provided in two concentric grid circuits on the base of the bottle. Each code character is composed of two bits, namely one in the outer grid circuit and one in the inner grid circuit. In order to read the code reliably, the bottle is rotated four times about its longitudinal axis during each reading procedure. The camera is a line-scanning camera which serially photographs the code characters passing the gap in the form of the graticule markings. This known reading process is certainly impaired less by external influences, as the camera photographs the code characters from the inside of the bottle, but it requires time and equipment on account of interruption of feed and repeated rotation of the bottles during each reading procedure, and on account of the apparatus necessary for clamping and rotating the bottle. The code used is costly, because the code character chain is composed of two concentric circular rings, which can only be provided on the bases of bottles. This would hardly permit more than mould cavity number information to be coded and would be applicable to glass bottles in any case. In this known process, working with code characters in two grid circuits cannot be avoided, however, because on the one hand each code character is composed of two bits, and on the other hand the beginning and end of a code character chain has not otherwise been able to be marked.

It is also already known from U.S. Pat. No. 4,644,151 to provide a code character chain in two rastered circles on the bottle wall above the bottom, the illumination and reading of these being performed, however, from the outside as in the Applicant's above mentioned U.S. Pat. No. 4,852,415. The difference is simply that in place of the light sensor there is a camera.

A code reading process is in fact already known from U.S. Pat. No. 3,963,918, in which the code character chain is composed of only one circular ring which is provided on the base of a glass or plastic bottle, but in any case in this known process all the above-mentioned problems would appear to occur. In this known process, the light of a lamp is directed from above through the neck of the bottle onto the bottle base, and the bottle does not have to be rotated about its longitudinal axis during the reading procedure. A light detector is provided underneath the bottle base and has a reading head which is rotated about the longitudinal axis of the bottle, for the serial recording of the code characters. This is to say, the so-called scanner technique is used for working, in which a reading head rotates instead of the bottle. The time expended does not become less, although possibly the expenditure on apparatus does, as it is easier to set a reading head rotating constantly in the same position and alignment than bottles, which have to be clamped and rotated in succession over the one and the same reading head in as identical as possible an alignment and position. In the case of this known process also, each code character is composed of several bits. In order that the beginning of the code character chain can be determined, a special character combination of four grid markings arranged close beside each other is provided with which reading-off is intended to begin. Data sampling preferably takes place several times, in order to increase the reading accuracy. Nevertheless, the use of a self-correcting code with parity markings is provided for this known process.

U.S. Pat. No. 3,991,883 describes a process and a device for the identification of a bottle, in which the code used corresponds to that used in the process described heretofore. A laser beam which is directed through the neck of the bottle onto the base of the bottle is used in order to illuminate the code character chain. Underneath the bottom of the bottle is arranged a mirror, which directs the emerging laser beam onto a sensor. For the reading procedure, it is necessary to set in rotation either the laser beam or, once again, the bottle, which is fraught with the problems described above.

Finally, from U.S. Pat. No. 3,745,314 are known a device and a process for identifying the mould cavity of a bottle, in which a lamp arranged over the bottle mouth and directed onto the bottom of the bottle and a reading unit arranged underneath the bottom of the bottle are at rest, but a rotatable prism is provided between the reading unit and the bottom of the bottle which directs the image of the bottom of the bottle via a condensing lens onto the reading unit and sets it rotating on the latter. The code character chain which is provided on the bottom of the bottle here again consists of two concentric rings. Because of the necessary relative movement between lamp and bottle on the one hand and reading unit on the other hand, which is created here by the rotating prism, the same problems arise as with the other known processes and devices in which this relative rotary movement is likewise necessary. With regard to the time expended at least, it is insignificant that a prism is rotated instead of the bottle or the reading device in order to achieve a serial reading of the code characters.

The problem of the invention is to improve a code-reading process of the type hereinbefore mentioned in such a way that the code can be read expending considerably less time and with a greater information content without any loss of accuracy.

SUMMARY OF THE INVENTION

Originating from a process of the type hereinbefore mentioned, this problem is solved in accordance with the invention, in that an instantaneous image or snapshot of the lower area of the bottle with the entire code character chain is obtained and is stored as an image for the subsequent decoding of the same.

The process according to the invention drastically reduces the time consumption for reading a code, because the code is not serially read but is retained as a single image by means of the snapshot. For such a snapshot it is necessary at most, if at all, to slow down somewhat the feed of the bottle underneath the camera, so that there is an adequate image exposure time in which to photograph all at once an image of the bottom area of the bottle with the complete code character chain. The decoding of the information from the code which is stored as an image can occur later when the bottle has long since left the code-reading station of the inspection machine. The advantage which the reading process according to the invention brings in respect of expenditure on apparatus is important, because it makes unnecessary any rotating devices. The single image taken as a snapshot by the process according to the invention contains not only the code but considerably more information, for example, concerning defects in the bottom area of the bottle, dirt or paper residues etc. This additional information can similarly be evaluated alongside the decoding. This combination of the code-reading process with the other inspection of the bottom area of the bottle brings with it a further reduction of both the time expended and the apparatus cost.

The subject-matter of the subsidiary claims constitutes advantageous developments of the invention.

The code provided one embodiment of the invention, in which each code character is composed of a single bit, makes the code-reading process not only particularly simple and reliable, but also makes it possible to accommodate a particularly large information content in the code character chain. The code can also be reliably read under difficult conditions such as wet operation, in which soap solutions are used as transport lubricants.

The histogram technique used for decoding the image of the code character chain in a further embodiment of the invention makes the evaluation of the photographed image especially simple and accurate.

The stages accomplished in another embodiment make it possible to decode in a problem-free manner the image of the code character chain photographed, even if the centre point of the bottom of the bottle should not happen to coincide with the centre point of the circle on which the code is situated, if the image should be blurred, or if the code character should have lost its sharpness because of ageing of the bottle. From U.S. Pat No. 3,502,993 it is known per se for a signal level and a background level to be logged separately and compared. This merely serves, however, to compensate for level variations which have no bearing on the signal information.

Another embodiment development of the invention avoids a time-consuming algorithm for locating the start and stop bit of the code. Moreover, it offers the possibility of using code characters composed merely of one bit in order to determine the beginning and end of the code character chain, as a result of which no space in the code character chain is wasted.

Altogether, the code-reading process in the several embodiment of the invention makes possible a considerable reduction both of the software and also hardware expenditure in comparison with other code-reading processes.

The code read through the process according to the invention in another embodiment is a binary bar code, which is validated or secured by the familiar Hamming distance. The possibility of a correction of the code, e.g. as here according to Hamming, is a specially great advantage of the invention. The Hamming distance states the minimal number of different bits for their value which appear in the comparison of all the characters of their code. The Hamming distance is a precautionary measure for security against transmission errors and serves to check and correct the reading reliability. The code preferred in the case of the invention could in fact contain 8, 16, 28, 32 etc. bits, but 16, 28 or 32 bits is the preferred number of bits at present to represent the data which is necessary on multitrip PET bottles. The code is introduced onto the bottles by the bottle manufacturer in the course of bottle manufacture.

A further advantage of the code in one embodiment of the invention makes it possible for data normally required by the manufacturers of multitrip PET bottles, such as date, production line (and therefore manufacturer) and type of bottle, and also further details such as colour and size of bottle etc. to be fixed permanently on the bottle so as to be reliably read.

In another embodiment of the invention, the code can also be read if it is not on the bottom of the bottle, but in the area on the outer wall of the bottle which is between the bottom and the level of the bottle where the bottle circumference is at the maximum. The relevant prior art described hereinbefore shows that up to now it has been normal practice to read a code which is fixed in the aforementioned area by the known simple reading process, in which light is directed from outside onto the code and the light reflected back outwards or non-reflected light is used for decoding the code, which is fraught with the problems hereinbefore described. In all the known processes in which the camera points through the bottle mouth onto the bottom of the bottle or the light is directed onto the bottom of the bottle and the camera or reading unit is outside the bottle, only codes which are provided on the bottle bottom can be used. One development of the invention has made it possible to operate with codes which, as in the above-mentioned U.S. Pat. No. 4,644,151, are provided where as much data as possible can be accommodated, and to read this without relative movement between camera, bottle and illumination source, in contrast to the prior art. It is obvious that a code character chain on the bottom of a bottle can record less data or data with less resolution than a code character chain which is provided where the circumference of the bottle is almost at the maximum. Up to now, it has obviously been considered impossible to read a code which is provided in this area of the bottle above the bottom of the bottle other than optically from outside. The great time expenditure associated therewith obviously had to be taken into account in the prior art.

A "smearing" in the single image photographed is prevented reliably in accordance with another embodiment of the invention.

In a still further embodiment of the invention, the snapshot can be taken in a simpler manner without "smearing", i.e. without flash illumination or a specially short exposure time, because the operation is performed with zero relative speed of rotation between camera, bottle and illumination source.

BRIEF DESCRIPTION OF THE DRAWINGS

An exemplified embodiment of the invention is described in greater detail hereafter with reference to the drawings.

FIG. 2 shows a code which, in spite of a large data content, can be reliably read by the process according to the invention, FIGS. 3a and 3b show in two views a snapshot of a new and an old transparent bottle respectively, with an annular chain of code characters, FIGS. 4a-4i in several diagrammatic partial illustrations the practical use of the histogram technique the process according to the invention.

DESCRIPTION OF THE PREFERRED EMBODIMENTS

Figure 1:
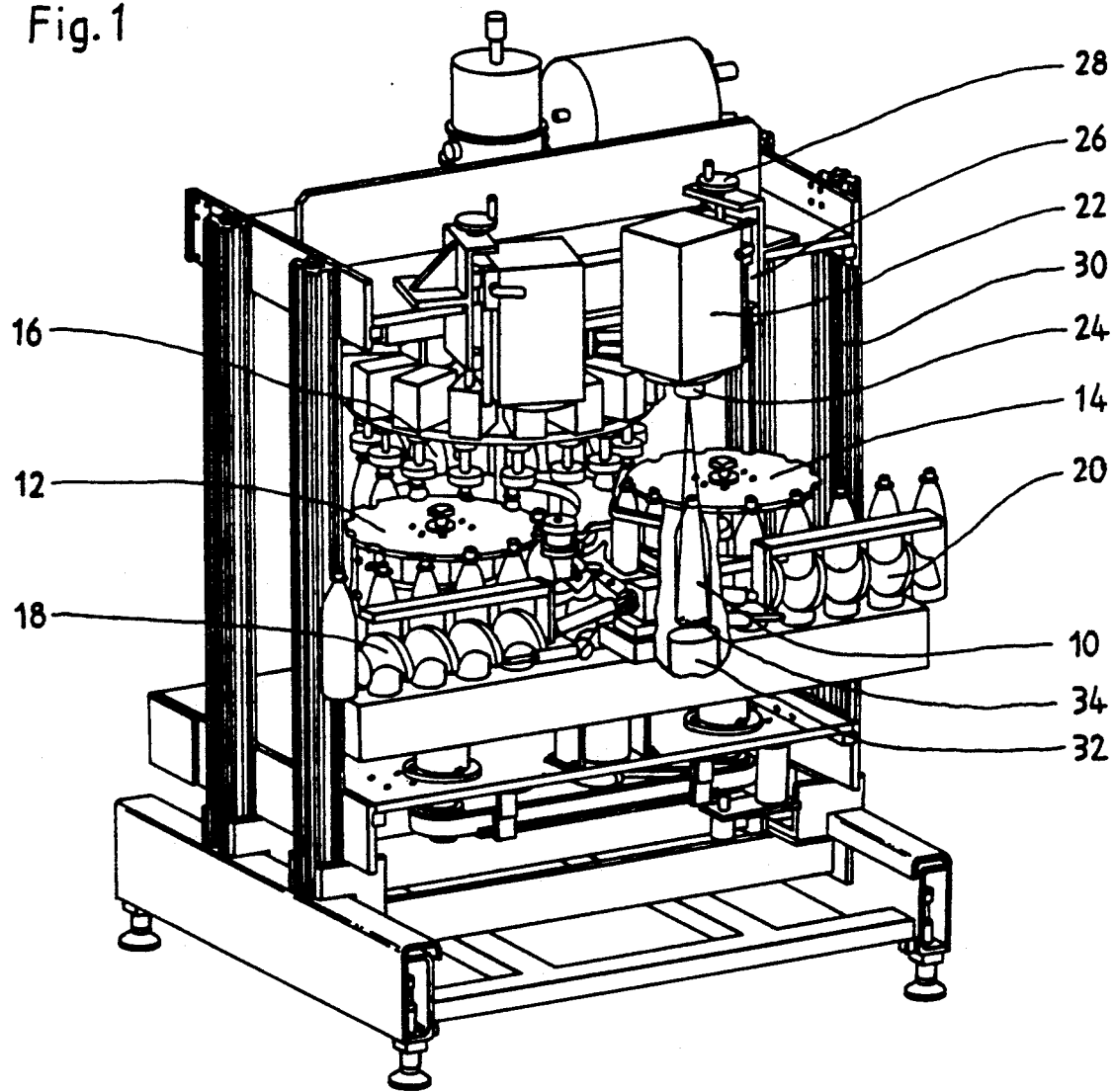
FIG. 1 shows a bottle inspection machine in which the process according to the invention is used.

FIG. 1 shows a perspective overall view of an inspection machine for PET bottles, of which only one bottle 10 is indicated. The machine has an entry carousel 12 and an outlet carousel 14 each with twelve stations for accepting twelve bottles 10 respectively. Each carousel is composed of two star discs. The upper star discs centre the bottles 10 in the neck region. Between the carousels 12 and 14 there is a main carousel 16, which has sixteen stations. Each station of the main carousel 16 is equipped with a complete testing unit for volume and leakage measurement, height measurement, straightness measurement, mouth bevel measurement and wash residue checking, which are not described in greater detail here. The bottles 10 are fed by an inlet worm 18 to the inlet carousel 12. On the outlet side, the bottles 10 are led out of the machine again by means of an outlet worm 20.

Above the outlet carousel 14 is arranged a camera box 22 for the code reading. The camera box 22 contains a camera 24, of which merely the lens is visible. The camera box 22 is fastened to a slide 26 which, for focussing the camera, is height-adjustable by means of a hand wheel 28 on a machine stand 30. Opposite the camera 24 is arranged an illumination source 32, by means of which the bottom of the bottle, which is between the lighting source and camera, is evenly illuminated. The camera 24 is preferably a high-resolution CCD camera, such as for example, Fairchild Type 1300, with a special high-speed vision pick-up module (not illustrated). The camera 24 is focussed on the bottom area of the bottle 10 in such a way that a code character chain 34 which is applied to the outer wall of the bottle in the are between the bottom of the bottle and the level where the circumference of the bottle is at the maximum, is also photographed from the inside of the bottle. If the bottle 10 has been moved by the outlet carousel 14 with its longitudinal axis in the connecting line between the camera 24 and the illumination source 32, the camera 24 takes a picture of the bottom of the bottle including the adjacent bottom area of the side wall of the bottle as a snapshot.

FIG. 3a shows such a snapshot of a new white bottle. FIG. 3b shows such a snapshot of a used white bottle. The code character chain 34 ca be recognized clearly in each of the two pictures, this consisting of a binary bar code whose construction is shown in FIG. 2. It is a bar code which is secured by means of a Hamming distance, and which in the example shown is composed of thirty-two bits, that is to say a start bit and a stop bit, six test or check bits and twenty-four data or data bits. The data bits, as already explained hereinbefore, are divided into three fields for date, production line type of bottle, and also a reserve field. The code character chain in the exemplified embodiment described here extends over less than 180 degrees of the circumference of the bottle.

An important feature of the code-reading process described in greater detail hereafter is that the code character chain 34 is not logged serially bit by bit, but as a complete single image in an instantaneous image or snapshot. By the term "snapshot" it is meant that a photograph is taken with a short exposure time, in order to prevent "smearing" or indistinctness of any sort in the single image which is photographed. In order to take the picture, it is therefore required to have no relative rotational movement between the camera 24, the bottle 10 and the illumination source 32. A photoflash lamp serves as an illumination source 32. It is sufficient to slow down slightly the speed of rotation of the outlet carousel 14, i.e. the feed of the bottle 10 for the photograph, or to arrest the outlet carousel 14 just for the necessary picture photographing time (which may be in the order of magnitude of a fraction of a second). But this is also unnecessary if, as provided for here, a high-speed camera and a high-speed vision pick-up module are employed. The picture taken is stored in the latter for further processing. As the picture photographed, in addition to the code character chain 34, also contains data about the entire bottom area of the bottle, it can also be brought into use for examining the bottom.

With reference to FIGS. 4a-i, the image evaluation will be described in greater detail, the purpose of which is to decode the data which is contained in the stored image from the code.

Figure 4A:
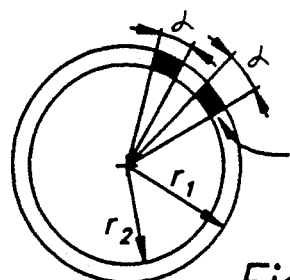
Figure 4B:
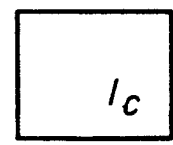
Figure 4C:
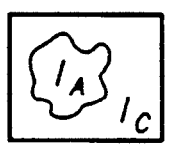

According to FIG. 4a, the code is defined as a chain of characters or bars, each composed of one bit B. Each bit B or each bar is the area which is formed between two radii $r_1$ and $r_2$ and an angle $\alpha$. The bits B can be at a distance from each other by any angle. The first bit in the chain is the start bit, and the last bit is the stop bit. In the case described here, in which the code as in FIG. 2 is used, the code character chain 34 is composed of thirty-two bits.

In order to determine the size of the surface of one bit B, the histogram of a certain area of the surroundings is initially calculated. By way of explanation, it should be stated that by histogram is generally meant a graphic representation of the frequency distribution of an actual value random variable which is observed. The value range of the variable is represented on an abscissa and divided there into intervals. Each interval is taken as the bottom side of a rectangle, whose surface is proportional to the observed frequency of values within the corresponding interval. In the present special case, this surface is considered as being proportional to the intensity.

First, the area which will encompass one bit B is defined. This area can be a complete image C, which is characterized by a predetermined intensity $I_C$, FIG. 4b.

The calculation of the histogram of this image C will produce a constant value $N_{C1}$, which is equal to the size of the area of the image C. In the simplified case illustrated in FIG. 4b, the image C is a rectangle. A spot of any shape is now added to the background, i.e to the image C, FIG. 4c. The spot is characterized by an intensity $I_A$, which is not equal to $I_C$. As the histogram of the image C is already known, it will again give a smaller surface $N_{C2}$ for the surroundings, FIG. 4c $$N_A = N_{C1} - N_{C2}$$

would therefore be given for the surface $N_A$ of the spot.

Figure 4D:
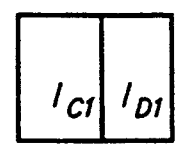

Slightly more complex is the case in which the surroundings are not homogeneous, but have two different intensities $I_{C1}$ and $I_{D1}$ for example, FIG. 4d.

Figure 4E:
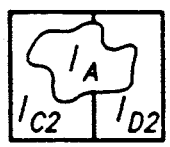

The calculation of the histogram of this background gives $N_{C1}$ and $N_{D1}$, i.e. the surface for the left and right part of the background. A spot is now added as shown in FIG. 4e. The intensity of this spot is $I_A \neq I_C$ or $I_D$. The histogram of the image gives $N_{C2}$, as the surfaces of the background.

$$N_A = (N_{C1} - N_{C2}) + (N_{D1} - N_{D2})$$

is thus given as the surface of the spot.

The same process can also be used with an even higher degree of complexity.

In order now to be in a position to calculate the surface of each bit B in the code, a definite surroundings area for each bit must be created in the code. It must be ensured that the surface of the background is known before the code is added to the background. This addition of the code to the background can be a procedure of superimposing two images. The background, which can be designated as a pattern SCH, is created in the following stages.

Figure 4F:
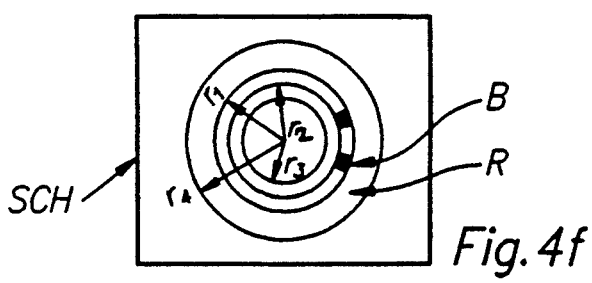
Figure 4G:
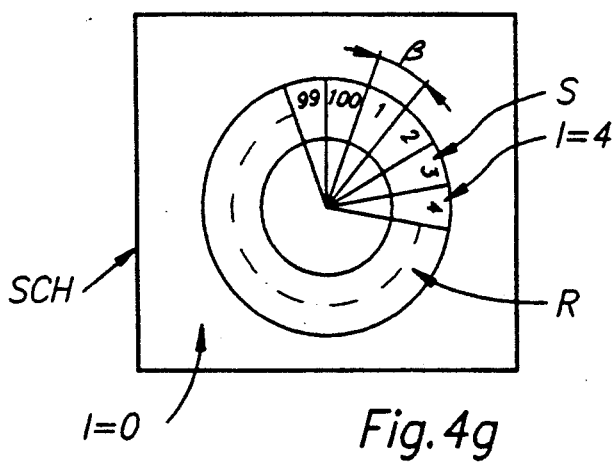

Firstly, according to FIG. 4f, a ring R with the radii $r_4$ and $r_3$ is outlined, in which $(r_4 - r_3) > (r_1 - r_2)$ applies, whereby the sensitivity regarding the position of the longitudinal axis of the bottle is eliminated. Problems might otherwise arise if the centre point of the bottom of the bottle does not coincide with the centre point of the circle on which the code is situated. In order therefore to ensure that the background ring completely encompasses each bit in the code, the two images or ring surfaces are superimposed on each other, FIG. 4f.

The second stage consists of cutting the pattern ring R into sectors S, each with the angle $\beta$, in which $\beta \leq \alpha$ applies. The sector angle $\beta$ is therefore smaller than or equal to the angle $\alpha$ of a bit B. In the special example described here, $\beta = \alpha = 3.6°$ applies, on account of which $360°/3.6 = 100$ sectors S per pattern ring will be available, FIG. 4g.

The next stage consists of associating another intensity with each pattern sector S. The first sector can be characterized with the intensity 1, the second sector with the intensity 2, etc., and the remainder of the pattern, i.e. its area outside the ring R, can be characterized with the intensity $I = 0$.

Figure 4H:
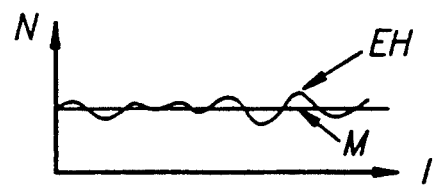
Figure 4I:
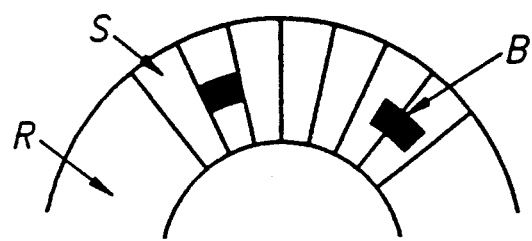

The histogram of the pattern is now taken. This supplies the surface of each pattern sector. As each is associated with a different intensity I, the number of pixels for each intensity will supply the surface N of the sector S. Considered purely mathematically, an average value M of the histogram representation will be provided, FIG. 4h, in which the surface N is plotted against the intensity I and the real histogram EH is the irregular line for which M is the average value. With every finite pixel surface there occur variations over the average value histogram, as shown in FIG. 4h. These variations present no difficulties as each sector surface is exactly known. This procedure is carried out only once and is then retained in the memory of the computer which is used.

By now adding the code to the pattern SCH (to the background), each bit B of the code can lie in a sector of the pattern ring R, or, which is most probable, be superimposed on one part of two adjacent sectors. Even if a bit B were to be superimposed on three or more than three sectors, this would present no difficulties, as each sector is characterized by its own intensity, FIG. 4i.

Care must also be taken to distinguish the bits themselves. For this the bit characteristics should lie outside the region of the pattern sector characteristic. One of the possibilities for superimposing the two images consists of effecting a simple summation of the two images, pixel by pixel. If the maximum intensity which is associated with a sector S of the pattern were the value i, then the lowest intensity which can be associated with one bit is $i+1$, and the intensity zero is associated with the remainder of the image. After summation, the order of intensity of the bits ranges from $i+1$ to $2i+1$, which lies outside the range of intensity of the pattern sectors, so that no bits become lost in the superimposition. By using the histogram of the superimposed image, a direct depiction of the code on the image is obtained, i.e. by comparison of the histogram with the pattern histogram retained in the memory. A bit is located by determining that if the surface of a pattern sector or of two adjacent pattern sectors decreases in the order of magnitude of one bit, it means that there is a bit in this position or with these coordinates. As the code character chain likewise forms an annular surface, each bit has the shape of one sector. When the code characteristic chain is decoded, its start and stop bit can thus be located. The sector where the intensity is reduced for the first time in the code characteristic chain contains the start bit, and the sector where the intensity of the code character chain is reduced last contains the stop bit.

The start and the stop bit of the code can be located without a time-consuming algorithm in the following manner. The code length in the example described here amounts to $Y=32$ bits and the number of pattern sectors is also assumed to be 32. The pattern sectors are examined in ascending order, in order to find a pattern sector X which contains one bit, and if this is the case, the pattern sector which is removed from the pattern sector X by $(Y-1)=31$ pattern sectors is examined in order to determine whether it contains a bit, and if so, the pair of bits located is used as a start and stop bit, and if not, the two aforementioned examining, stages, are repeated until a pair of bits is located which are removed from one another by thirty-one bits. If no such pair of bits were able to be found by this means, this would mean that there is an error, that is to say, the bottle is not clean or is scratched too much, and the code has not been correctly read, or something similar.

We claim:

1. Process for reading a code character chain having code characters which are arranged on an annular surface of a transparent bottle in the bottom area of the same, each code character of the code character chain having a bar-shape and representing a single bit, by directing a camera through the neck of the bottle into the bottom area of the bottle, illuminating the bottom area of the bottle from outside and storing and decoding of the code character chain which is photographed with the camera, characterized in that an instantaneous image of the bottom area of the bottle with the complete code character chain is taken and stored, and the stored image is then processed by a histogram technique for decoding the code character chain, which technique includes the following steps:
    (a) selecting a pattern in the form of an annular surface which is larger inwardly and outwardly than the annular surface on which the code character chain is arranged,
    (b) dividing the annular surface of the pattern into a number of pattern sectors whose circumferential width is in each case smaller than or equal to that defined by one complete code character;
    (c) defining each pattern sector by a different intensity in terms of a number of pixels, which is proportional to the surface area of each pattern sector;
    (d) superimposing the annular surface of the pattern and the annular surface of the code character chain;
    (e) determining from the step of superimposing the pattern sector or group of adjacent pattern sectors in which the intensity or surface area has been reduced by that of a code character in the chain;
    (f) designating the pattern sectors of reduced intensity as containing the code character chain; and
    (g) decoding the code character chain from the sector wherein the intensity has been reduced for the first time, to the sector where the intensity has been reduced last.

2. Process as claimed in claim 1 wherein the step of decoding is further characterized by the following steps for determining the start bit and stop bit of the code character chain:
    (a) examining the pattern sectors in ascending sequence in order to find one pattern sector which contains at least a portion of one bit and then,
    (b) examining another pattern sector which is removed from the one pattern sector by one less than a known number of pattern sectors occupied by the code character chain to determine whether the removed pattern sector contains a bit, and
    (c) repeating the steps of examining as often as necessary until a pair of bits is located in the one pattern sector and the removed pattern sector, the bit of the one pattern sector being designated the start bit and the bit of the removed pattern sector being designated the stop bit.

3. Process as claimed in claim 2, characterized in that the chain of code characters has twenty-eight bits, which is secured by means of a Hamming distance, and contains between the start and the stop bit six test bits and the remainder data bits.

4. Process as claimed in claim 3, characterized in that the data bits are divided into three fields for date, production line and type of bottle and into a reserve field.

5. Process as claimed in claim 2, characterized in that the chain of code characters has thirty-two bits, which is secured by means of a Hamming distance, and contains between the start and the stop bit six test bits and the remainder data bits.

6. Process as claimed in claim 5, characterized in that the data bits are divided into three fields for date, production line and type of bottle and into a reserve field.

7. Process as claimed in claim 1, characterized in that the camera is so focussed on the inner bottom area of the bottle, that a code character chain which has been applied to the outer wall of the bottle at the height at which the circumference of the bottle is at the maximum, is also photographed.

8. Process as claimed in claim 1, characterized in that the instantaneous image is taken with a short exposure time by means of flash illumination.

9. Process as claimed in claim 1, characterized in that the instantaneous image is taken with a zero relative speed of rotation between camera, bottle and illumination source.

* * * * *